(12) United States Patent
Celik

(10) Patent No.: US 7,296,036 B2
(45) Date of Patent: *Nov. 13, 2007

(54) METHOD AND APPARATUS FOR STORING AND RETRIEVING BUSINESS CONTACT INFORMATION IN A COMPUTER SYSTEM

(75) Inventor: Feyzi Celik, Hopkinton, MA (US)

(73) Assignee: OnePIN, Inc., Westborough, MA (US)

( * ) Notice: Subject to any disclaimer, the term of this patent is extended or adjusted under 35 U.S.C. 154(b) by 446 days.

This patent is subject to a terminal disclaimer.

(21) Appl. No.: 10/657,757

(22) Filed: Sep. 8, 2003

(65) Prior Publication Data

US 2004/0088259 A1  May 6, 2004

Related U.S. Application Data

(63) Continuation of application No. 09/223,129, filed on Dec. 30, 1998, now Pat. No. 6,374,259.

(60) Provisional application No. 60/102,614, filed on Oct. 1, 1998.

(51) Int. Cl.
G06F 17/30 (2006.01)
(52) U.S. Cl. ........................... 707/201; 707/10
(58) Field of Classification Search ............. 707/1–10, 707/100–104.1, 200–206; 709/203; 715/505; 705/1
See application file for complete search history.

(56) References Cited

U.S. PATENT DOCUMENTS

| | | | |
|---|---|---|---|
| 4,654,793 A * | 3/1987 | Elrod | ............................ 705/1 |
| 4,774,618 A | 9/1988 | Raviv | |
| 4,945,218 A | 7/1990 | Talbott | |
| 5,483,052 A | 1/1996 | Smith, III et al. | |
| 5,493,105 A | 2/1996 | Desai | |
| 5,590,197 A | 12/1996 | Chen et al. | |
| 5,604,640 A | 2/1997 | Zipf et al. | |
| 5,612,524 A | 3/1997 | Sant'Anselmo et al. | |
| 5,640,565 A | 6/1997 | Dickinson | |

(Continued)

FOREIGN PATENT DOCUMENTS

WO    WO 97/01137    1/1997

(Continued)

OTHER PUBLICATIONS

International Search Report for PCT/US06/38589, mailed Apr. 30, 2007.

*Primary Examiner*—Diane D Mizrahi
(74) *Attorney, Agent, or Firm*—Mintz, Levin, Cohn, Ferris, Glovsky and Popeo, P.C.

(57) ABSTRACT

The present invention provides methods and apparatus for storing information in a computer system, and for retrieving the information from the computer system. More specifically, the present invention provides methods and apparatus for storing and retrieving business contact information, including dynamic business cards in an internet-accessible database of a computer system. In one general aspect, the invention features an information management method. The information management method includes steps of assigning a first user a unique user identification number, storing information related to the first user in a remote database operatively coupled to a remote computer, and enabling a second user to access the remote database over a network using a second computer to retrieve the information related to the first user by entering the unique user identification number.

21 Claims, 11 Drawing Sheets

U.S. PATENT DOCUMENTS

| | | |
|---|---|---|
| 5,671,279 A | 9/1997 | Elgamal |
| 5,671,282 A | 9/1997 | Wolff et al. |
| 5,678,041 A | 10/1997 | Baker et al. |
| 5,689,654 A * | 11/1997 | Kikinis et al. .............. 710/303 |
| 5,692,073 A | 11/1997 | Cass |
| 5,715,399 A | 2/1998 | Bezos |
| 5,732,229 A | 3/1998 | Dickinson |
| 5,740,549 A | 4/1998 | Reilly et al. |
| 5,774,117 A | 6/1998 | Kukkal et al. |
| 5,791,991 A | 8/1998 | Small |
| 5,793,972 A | 8/1998 | Shane |
| 5,794,219 A | 8/1998 | Brown |
| 5,794,232 A | 8/1998 | Mahlum et al. |
| 5,806,043 A | 9/1998 | Toader |
| 5,848,412 A * | 12/1998 | Rowland et al. ................ 707/9 |
| 5,987,136 A | 11/1999 | Schipper et al. |
| 6,115,711 A | 9/2000 | White |
| 6,161,113 A * | 12/2000 | Mora et al. .................. 715/505 |
| 6,161,124 A * | 12/2000 | Takagawa et al. .......... 709/203 |
| 6,868,451 B1 | 3/2005 | Peacock ..................... 709/231 |
| 2004/0093317 A1 | 5/2004 | Swan ............................ 707/1 |
| 2005/0021571 A1 | 1/2005 | East ........................... 707/201 |
| 2005/0102328 A1 | 5/2005 | Ring et al. .................. 707/201 |

FOREIGN PATENT DOCUMENTS

| | | |
|---|---|---|
| WO | WO 98/03923 | 1/1998 |
| WO | WO 98/06055 | 2/1998 |
| WO | WO 98/24036 | 6/1998 |

* cited by examiner

METHOD AND APPARATUS FOR STORING AND RETRIEVING BUSINESS CONTACT INFORMATION IN A COMPUTER SYSTEM

RELATED APPLICATION

This application is a continuation of patent application U.S. Ser. No. 09/223,129, now U.S. Pat. No. 6,374,259, filed Dec. 30, 1998, which claims priority from U.S. Ser. No. 60/102,614, filed Oct. 1, 1998, each of which is incorporated herein by reference.

FIELD OF THE INVENTION

Embodiments of the present invention are directed generally to a method and an apparatus for storing information in a computer system, and for retrieving the information from the computer system. More specifically, embodiments of the present invention are directed to a method and apparatus for storing and retrieving business contact information in an internet-accessible database of a computer system.

BACKGROUND OF THE INVENTION

The use of business cards is widespread in virtually all industries and professions, and the problem of efficiently organizing business cards can be appreciated by most people. Various solutions have been presented for solving this problem. These solutions include manual schemes in which business cards are organized in a binder, a notebook or some similar apparatus. Prior art solutions also include computer-based systems wherein information on a business card is scanned into a computer and stored in a database in the computer. While these solutions offer some help in relieving the organization problem associated with business cards, it is desirable to provide a more efficient, easy to use system of organizing business cards.

A second problem associated with the use of business cards is that the information contained on business cards can not typically be updated once a card has been distributed. In today's fast-paced business world, it is not uncommon for the information on a person's business card to change frequently. It is desirable to provide a system for organizing business cards that allows information contained on the business cards to be periodically updated.

SUMMARY OF THE INVENTION

Embodiments of the present invention provide systems and methods for organizing and updating business cards that overcome the problems associated with business cards described above.

In one general aspect, the invention features an information management method. The information management method includes steps of assigning a first user a unique user identification number, storing information related to the first user in a remote database operatively coupled to a remote computer, and enabling a second user to access the remote database over a network using a second computer to retrieve the information related to the first user by entering the unique user identification number.

The step of assigning can include a step of providing the first user with a bar code representation of the unique user identification number. The method can further include a step of printing characters representative of the unique user identification number on a document, and the document can be a business card. The step of printing can include a step of printing the bar code on the document. The method can further include steps of establishing a second database of user information in the second computer, and updating information in the second database of the second computer by accessing information in the remote database. The second computer can access the remote computer over the internet. The method can further include a step of enabling the first user to access the remote computer over a network using a first computer to edit the information related to the first user stored in the remote database.

In another general aspect, the invention features an information management system. The information management system includes a remote computer, a remote database operatively coupled to the remote computer, the remote database containing contact information for each of a plurality of users of the information management system, wherein each of the users is assigned a unique user identification number, and the information for each user is stored along with the unique user identification number of the user in the remote database. The remote computer includes a network interface module that interfaces with a network to allow users of the information management system to access the remote computer, a database interface module that coordinates transfer of data between the remote database and the remote computer, and an application module containing instructions to enable a network user to access the remote database over the network using a second network computer to retrieve information in the remote database related to a first user by entering the unique user identification number.

The application module can further include instructions to provide the first user with a bar code representation of the unique user identification number. The network computer can include a second database, and the application module can include instructions to provide updating of information in the second database of the network computer with information in the remote database. The application module can include instructions to enable the first user to access the remote computer over the network using a first network computer to edit the information related to the first user stored in the remote database.

In yet another general aspect, the invention features an information management system. The system includes means for assigning a first user a unique user identification number, means for storing information related to the first user in a remote database operatively coupled to a remote computer, and means for enabling a second user to access the first database over a network using a second network computer to retrieve the information related to the first user by entering the unique user identification number.

The system can further include means for providing the first user with a bar code representation of the unique user identification number. The means for enabling can include means for updating information in a second database of the second network computer by accessing information in the remote database. The system can further include means for enabling the first user to access the remote computer over a network using a first network computer to edit the information related to the first user stored in the remote database.

BRIEF DESCRIPTION OF THE DRAWINGS

For a better understanding of the present invention, reference is made to the drawings which are incorporated herein by reference and in which.

DETAILED DESCRIPTION

Illustrative embodiments of the present invention, described below are directed to methods and systems for managing contact information, and in particular, business contact information such as that typically contained on a business card. However, embodiments of the present invention are not limited to methods and systems that manage business contact information, but rather, include methods and systems that manage other information as well.

Figure 1:
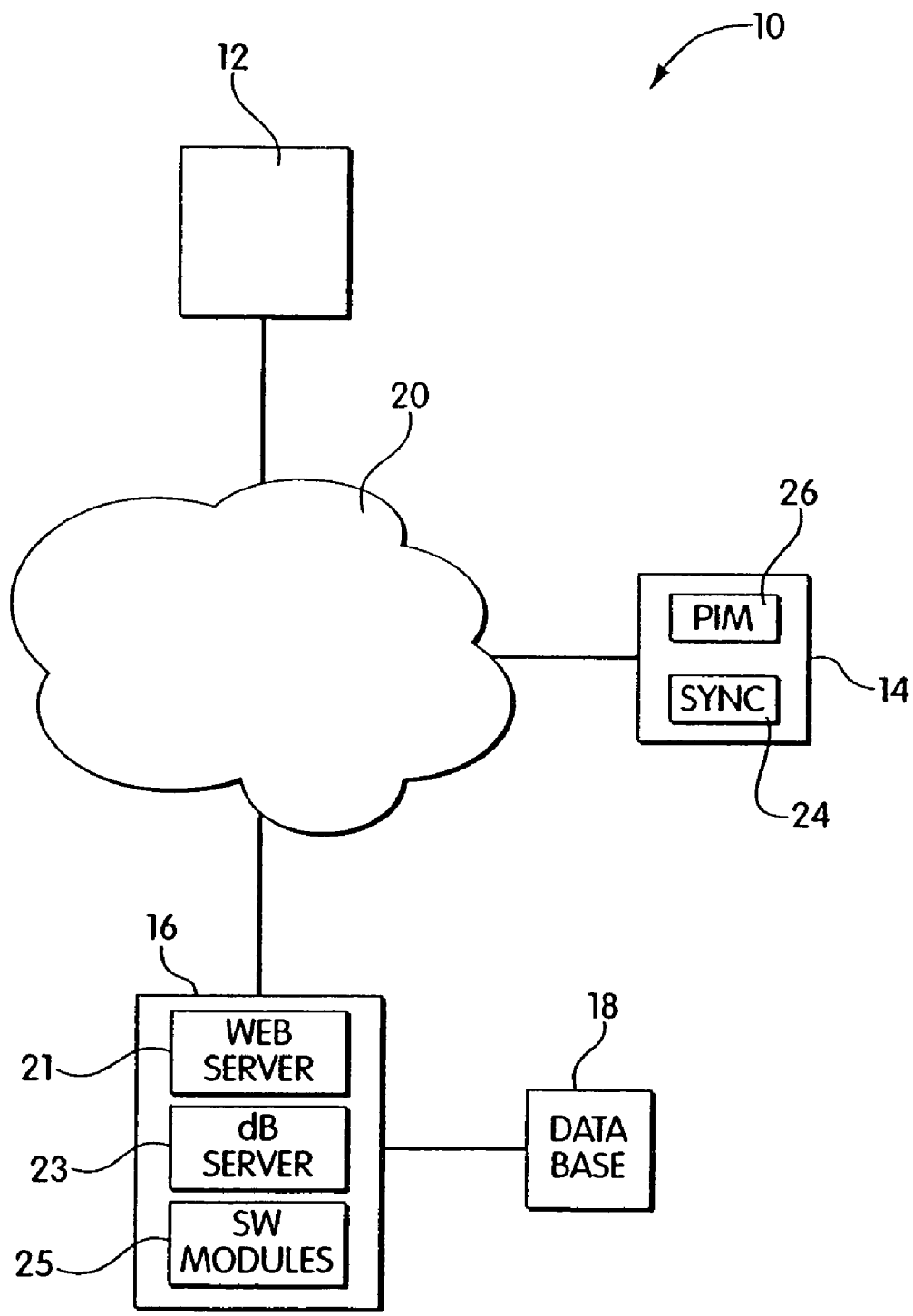
FIG. 1 is a block diagram showing one embodiment of a computer system used in embodiments of the present invention.
Figure 2A:
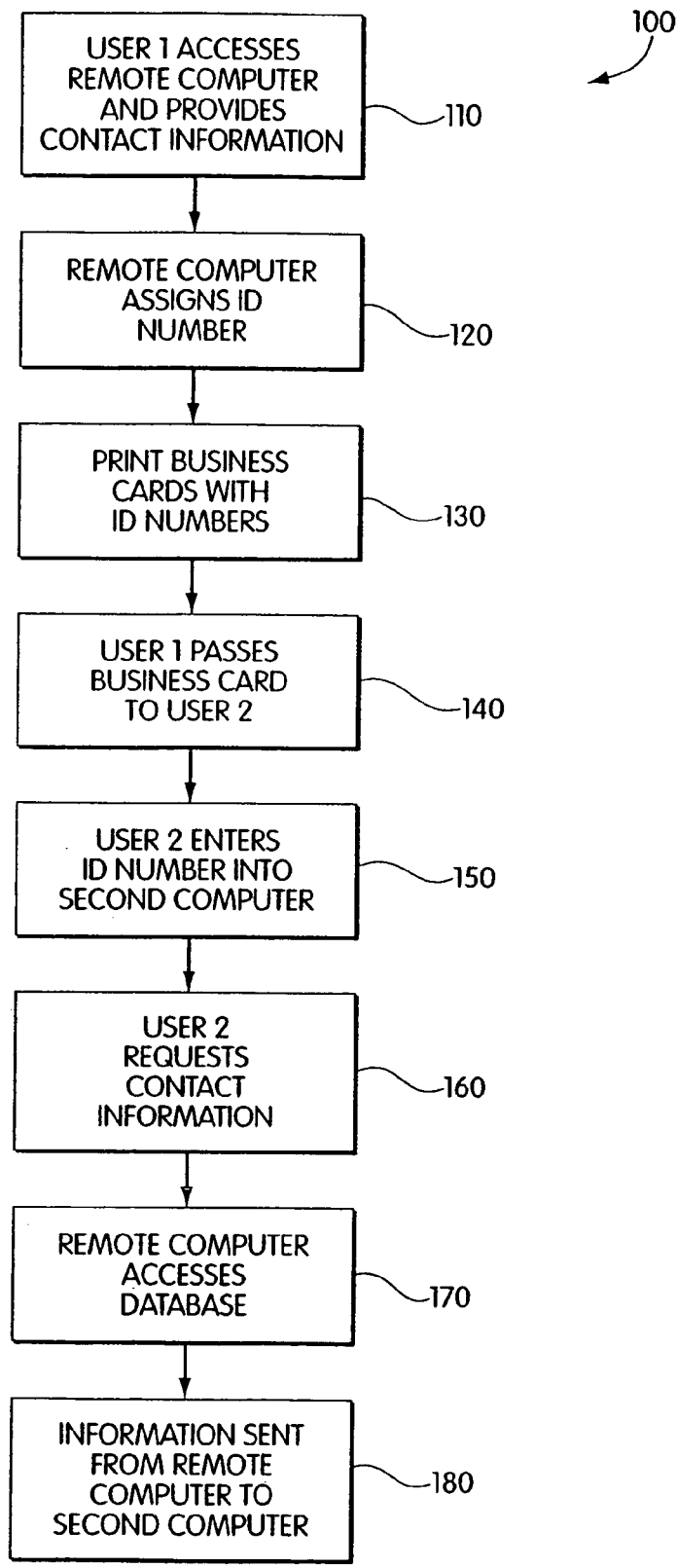
FIG. 2A is a flow chart of a method in accordance with one embodiment of the present invention.
Figure 2B:
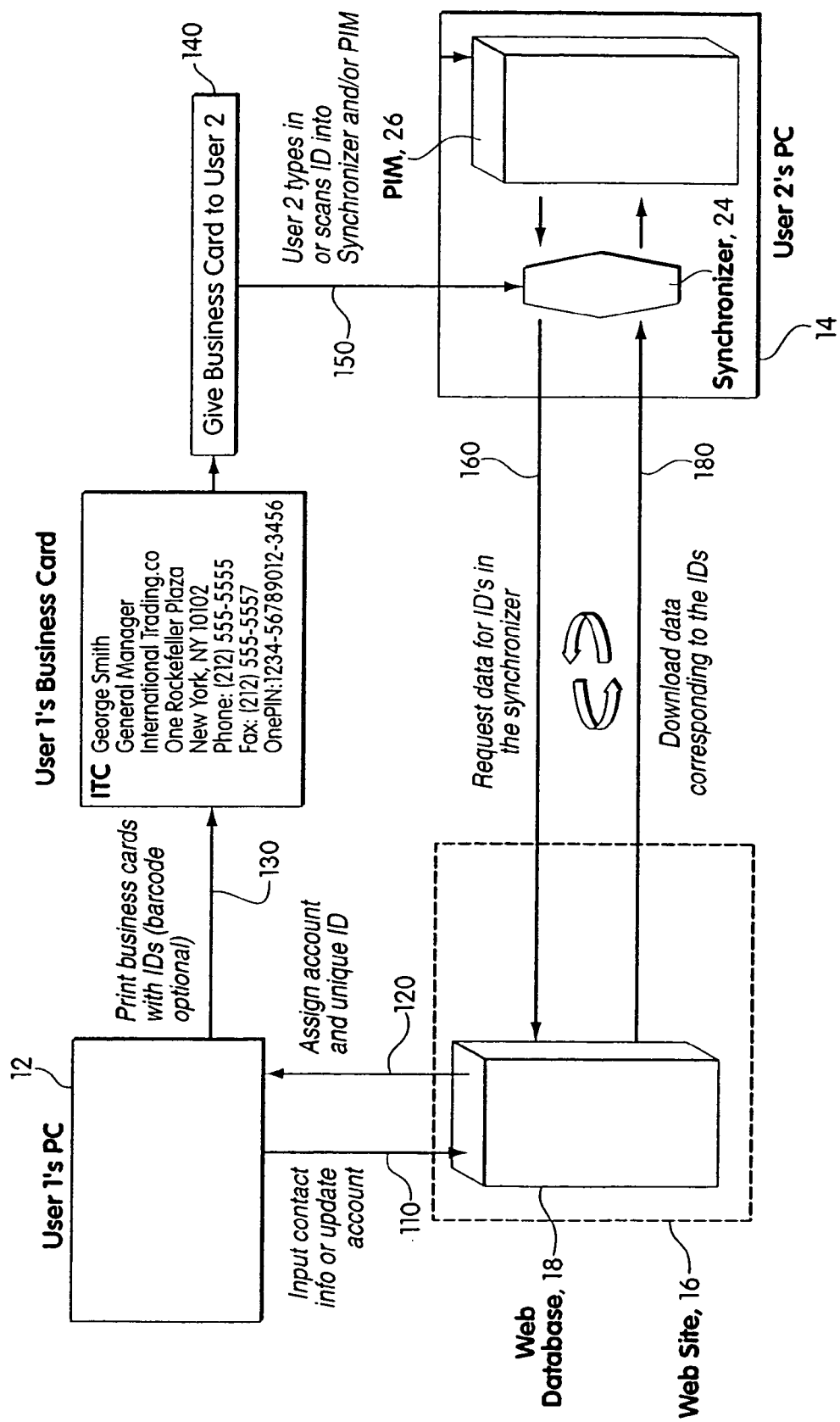
FIG. 2B is a block diagram demonstrating operation of the method of FIG. 2A in the computer system of FIG. 1.
Figure 3:
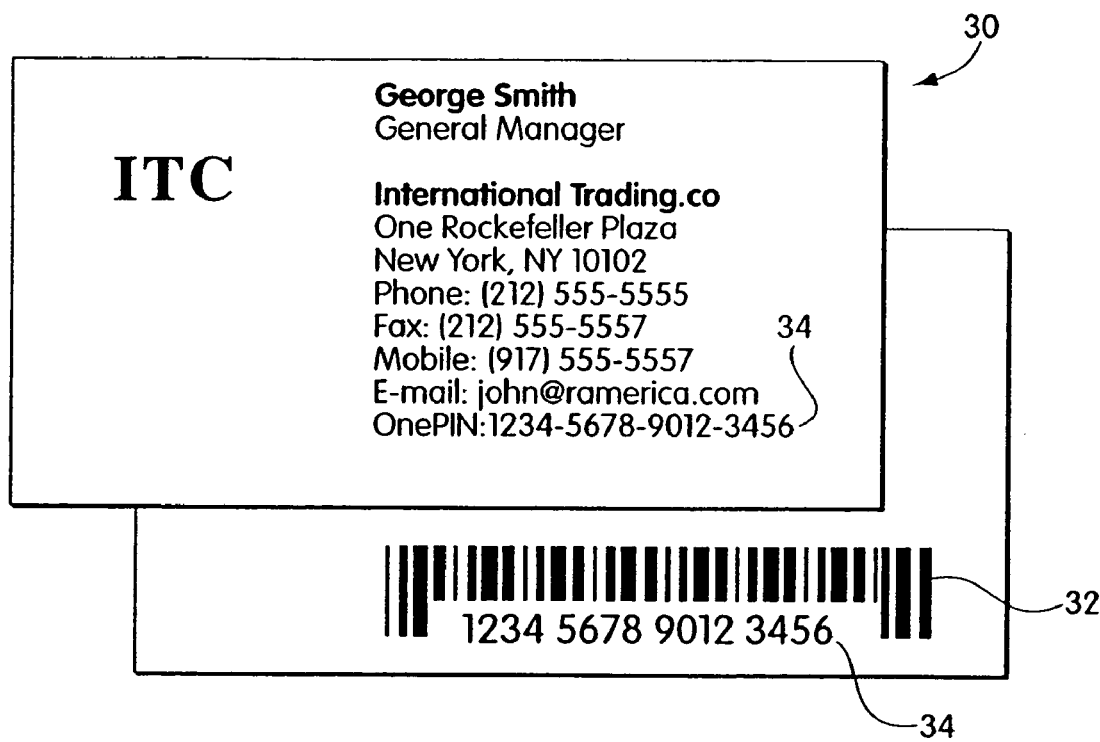
FIG. 3 is a diagram showing a business card used with embodiments of the present invention.

Embodiments of the present invention will now be described with reference to FIGS. 1-3. FIG. 1 shows a computer system 10 functioning as a contact information management system in accordance with one embodiment of the present invention. The computer system 10 includes a first personal computer 12, a second personal computer 14, and a remote computer 16 coupled to a database 18. The first computer and the second computer are coupled to the remote computer 16 over a network 20. In one embodiment of the present invention, the network 20 includes the internet, and the remote computer includes a web server and is accessible over the internet. The remote computer has an assigned uniform resource locator (URL) to allow the personal computers to access the remote computer over the internet. In other embodiments, the first and second personal computers may be coupled to the remote computer over a private dedicated computer network or the first and second personal computers may access the remote computer over a standard telephone line using a modem.

In one embodiment, the first computer 12 and the second computer 14 contain a web browser that enables the computers to access the remote computer over the internet using the URL of the web site, as is known in the art. In embodiments of the present invention, the web browsers may be implemented using one of several known internet browsers such as Navigator® available from Netscape Communications, Inc., preferably version 4.0 or higher, or Internet Explorer® available from Microsoft, Inc, preferably version 4.0 or higher.

As shown in FIG. 1, the second personal computer includes a synchronizer 24 and a personal information manager (PIM) 26. The PIM may be implemented using, for example, one of a number of personal information programs, such as such as Microsoft Outlook, Symantec's ACT! and 3COM's Pilot, that allow a user to maintain a database of contact information. The synchronizer may be implemented in embodiments of the present invention using software installed in the second computer. In embodiments of the present invention, the synchronizer may be implemented as a software utility downloadable over the internet from the remote computer 16. The synchronizer provides synchronization of contact information in the PIM with contact information contained in the database 18. In embodiments of the present invention, the first computer, as well as other computers coupled to the network 20, may also include a synchronizer and a PIM. In addition, in one embodiment, the synchronizer may be located in the remote computer in addition to or in place of the synchronizer in the second computer. Also, the synchronizer may be integrated into available PIM software.

A general method 100 in accordance with one embodiment of the present invention for operating the computer system 10 to implement a contact management system will now be described with reference to FIGS. 2A and 2B. In a first step 110 of the method, a user (hereinafter User 1) of the first personal computer 12 accesses the remote computer over the internet to input business contact information of User 1 or other information that User 1 wishes to store in the database 18. In response, in step 120, the remote computer 16 establishes an account for User 1, stores the contact information for User 1 in the database 18, and provides a unique identification number for User 1. In embodiments of the present invention, the database 18 may contain contact information for a number of users each of whom is assigned a unique identification number.

In the next step 130, User 1 (or a commercial printer selected by User 1) prints business cards for User 1 containing the unique identification number, and in step 140, passes. one of the business cards to a second user (hereinafter User 2). In one embodiment, in place of, or in addition to the unique identification number, a bar code, or some other code representative of the unique identification number, may be printed on the business card. FIG. 3 shows a business card 30 used with embodiments of the present invention having a bar code 32, representative of the identification number, printed on the back, and having the unique identification number 34, identified as a OnePIN™ number, printed on the front and on the back. In embodiments of the present invention, the bar code 32 and/or the unique identification number 34 can be printed at other locations on the business card 30.

In one embodiment of the present invention, a 16 digit number and/or letter combination or any other symbol combination can be used for the unique identification number. The use of 16 digits for the identification numbers provides sufficient unique numbers to allow random assignment of numbers to users with low probability of an unauthorized user guessing the unique identification number of an authorized user. In other embodiments, identification numbers may have more or less digits than 16. In addition, in embodiments of the present invention one of a number of known check sum schemes is used as part of a verification procedure of identification numbers.

In step 150 of the method 100, User 2 enters the unique identification number of User 1 into the second computer 14. User 2 can enter the unique identification number by typing the OnePIN™ number or by scanning the number into the synchronizer of the second personal computer using a wand, or some other bar code reader, coupled to the second personal computer 14. User 2 also can type in or scan the OnePIN number into PIM. As discussed below, the identification number is stored in the synchronizer and in the PIM of the second personal computer. The synchronizer and the PIM may already contain identification numbers for users of the contact management system other than User 1.

In step 160, the second personal computer 14 makes a request to the remote computer 16 for contact information corresponding to unique identification numbers contained in either the synchronizer or the personal information manager, and in step 170, the remote computer 16 accesses the database 18 to retrieve data corresponding to the identification numbers contained in the request from User 2. In step 180, the information retrieved from the database 18 is sent from the remote computer 16 to the second personal computer 14, wherein contact information for users corresponding to the unique identification numbers contained in the request in step 150 is updated in the PIM. The request provided in step 150 can be for contact information of User 1 or for contact information of several users, each of whom is identified by a unique identification number. Users that have been assigned identification numbers may access the database through the remote computer to edit the contact information contained for them in the web database at any time.

In the embodiment of the present invention described above, the computer system 100 has only two users, as understood by those skilled in the art, other embodiments of the present invention may include computer systems having many more users than two, and the web database may contain contact information for a large numbers of users.

The architecture of the computer system 10 in accordance with one embodiment of the present invention will now be described in further detail. The remote computer 16 includes a web server 21 to provide access to the internet and includes a database server 23 to provide access to the database 18. The remote computer also includes application specific software modules 25 that implement functions of the computer system 10 in conjunction with the web server and the database server. The web server 21, the database server 23, and the software modules 25 may be contained within one computer or may be installed in separate network ed computers that together comprise the remote computer 16. In a preferred embodiment, the operating system used for the computer or computers comprising the remote computer is Microsoft's Windows NT® operating system. In this preferred embodiment, the web server is implemented using Microsoft's Internet Information Server (IIS), version 4.0 or higher, and the database server is implemented using Microsoft's SQL Server, version 6.5 or higher. The web server includes application specific Active Server Pages to implement functionality of systems and methods of the present invention. In addition, in this preferred embodiment, the software modules 25 contain software code written in object oriented programming paradigm. In one embodiment, this includes an n-tiered architecture with a database layer including interfaces and stored procedures; a middle ware layer including MS Com models, JAVABEANS, and third party languages; and a client interface layer using Javascript, DHTML, PEAR and ASP.

Figure 4A:
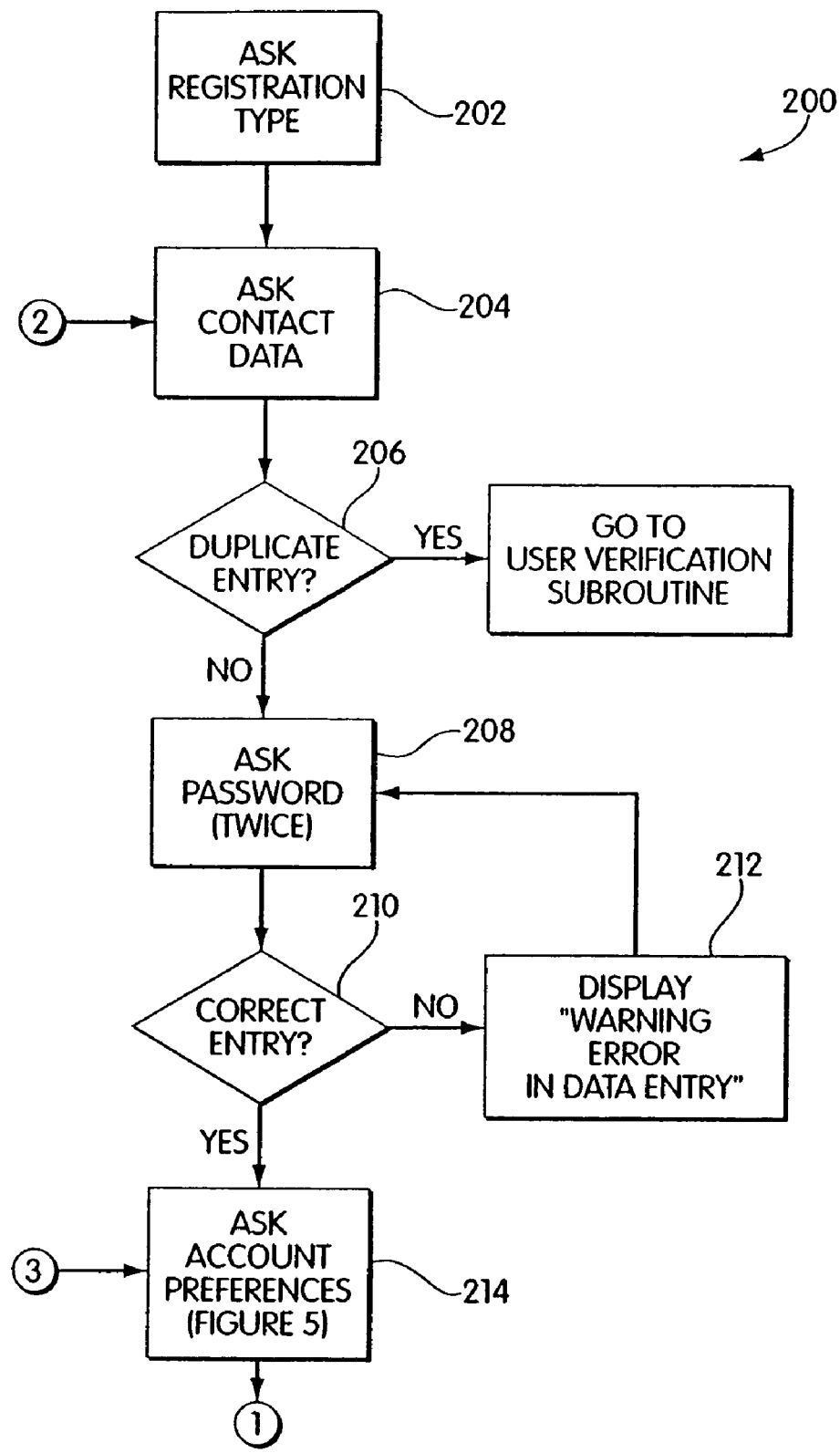
FIGS. 4A-4C show a flow chart of a registration process used in embodiments of the present invention.
Figure 4B:
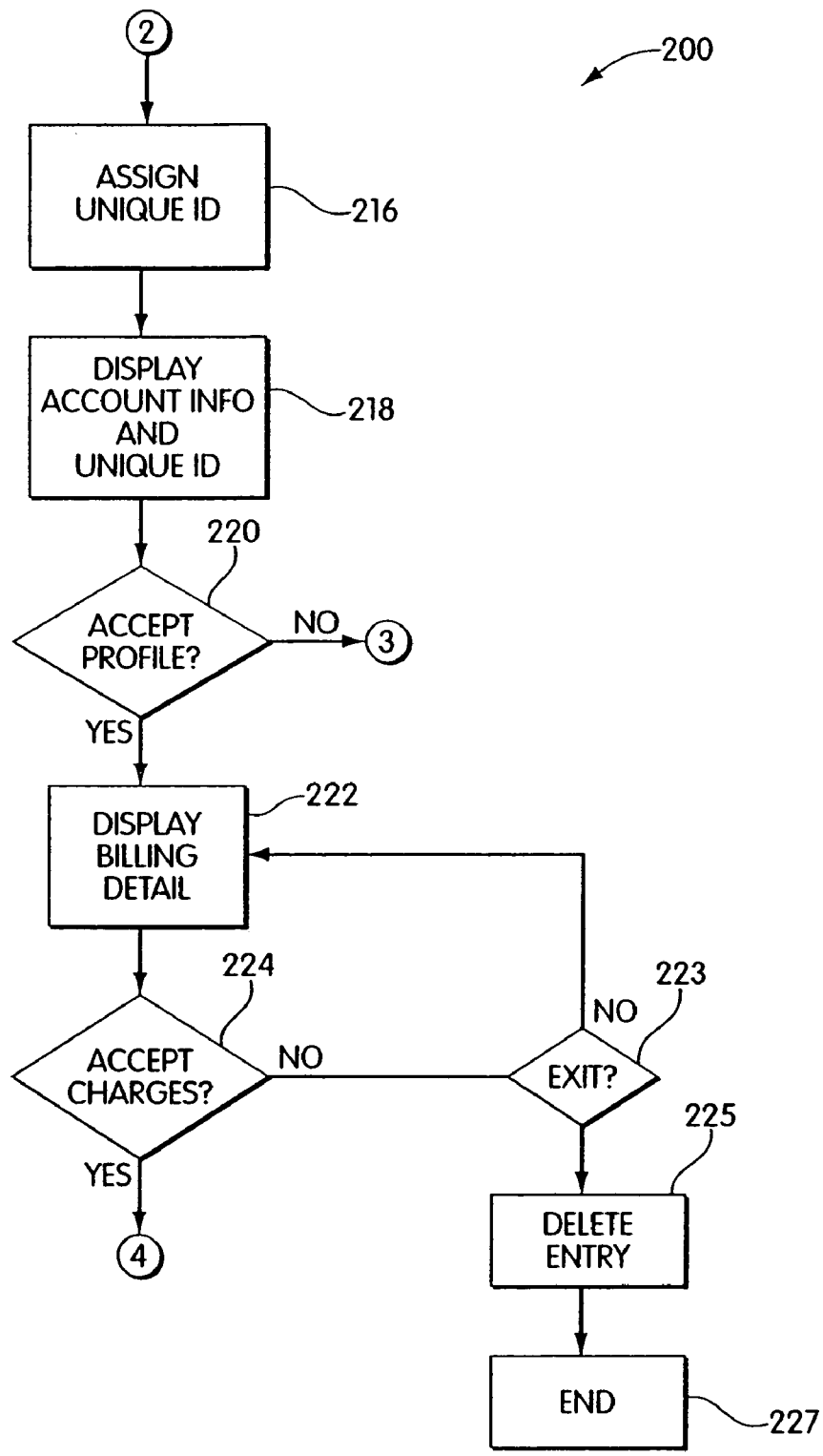
Figure 4C:
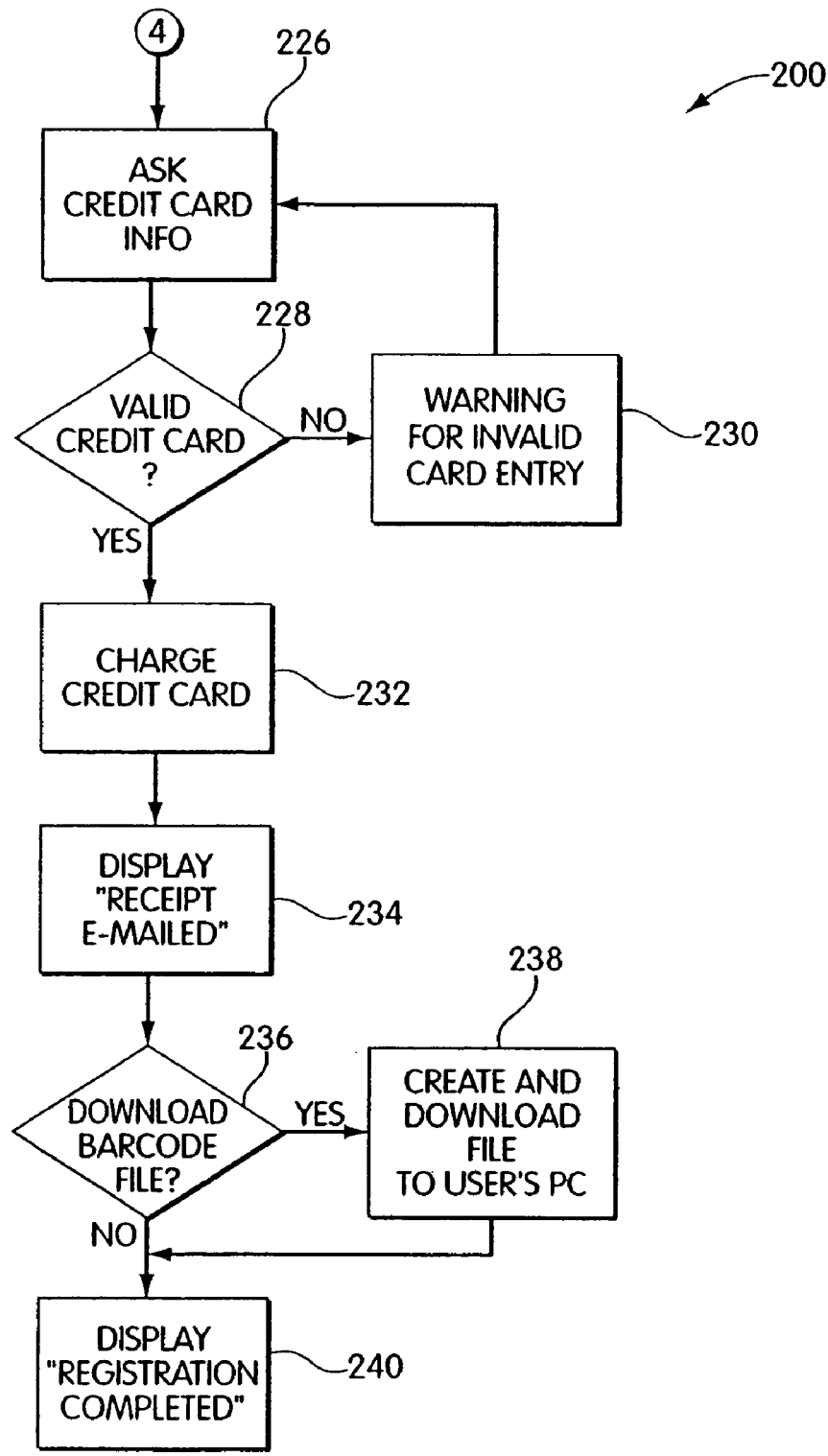

The steps of method 100 described above, as well as additional functions that may be implemented in contact information management methods and systems of the present invention, will now be described in further detail. FIGS. 4A-4C provide a flow chart of a registration procedure 200 of the remote computer 16 that allows a user, such as User 1, to register with a contact information management system of the present invention. In a first step 202 of the procedure 200, the system asks the user to provide a registration type. In embodiments of the invention, a variety of registration types may be used to distinguish a number of different services and/or payment plans that are available to users. For example, in one embodiment, there are different registration types for professionals, corporations, individuals, and children.

After the user selects a registration type, in step 204, the system asks the user to input contact data. The contact data includes, for example, the user's name, telephone numbers, facsimile numbers, pager number, home address, business address, employer, title, E-mail address, and any other information the user wishes to make available to other users of the contact information management system. Once the contact information is entered, then in step 206 the system attempts to determine whether the user has previously registered with the system. In one embodiment, the system makes this determination by scanning the database for names matching that input by the user, and if any matching names are found, the system compares the e-mail address of the user with the matching name with that input by the user to determine if a duplicate entry has been made. If the system determines that a duplicate entry has been made, then the registration process 200 terminates and the system performs a user verification process.

The user verification process allows a prior-registered user who has forgotten his/her password to verify their identify and change their password. In one embodiment, the user is requested to enter either their mother's maiden name or the last four digits of their social security number to verify their identity. Once their identity has been verified, the user is allowed to change their password. The user verification process allows users who have forgotten their passwords to access the system without creating unwanted, and memory consuming duplicate entries.

If in step 206 a duplicate entry is not found, then in step 208, the user is asked to establish a password, selected by the user, by entering the password twice. In step 210, the system determines whether the user entered the same password twice. If the outcome of step 210 is "NO", then in step 212, a warning message is provided to the user and the process then returns to step 208. If the outcome of step 210 is "YES", then the password entered by the user is assigned to the user.

Figure 5:
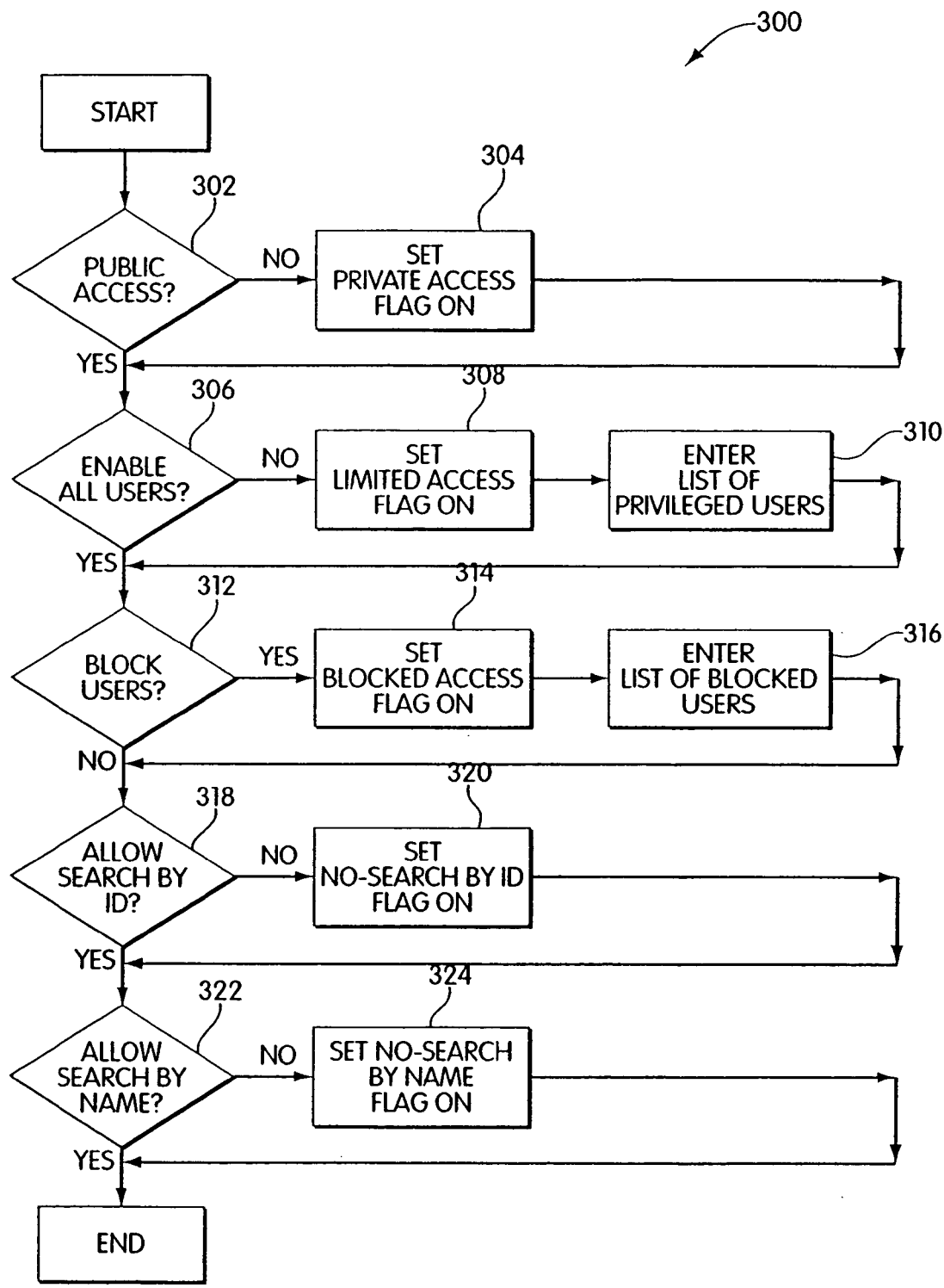
FIG. 5 is a flow chart of a process for establishing user preferences used in embodiments of the present invention.

The process continues with step 214, wherein account preferences are established for the user. In one embodiment, account preferences are established using a process 300 which will now be described with reference to FIG. 5. In a first step 302 of the process 300, the system queries the user as to whether the user wishes to allow public access to the user's contact information. If the response to the query in step 302 is "NO", then a private access flag is set on for the user in step 304, and the process continues with step 306. If the response to the query in step 302 is "YES" then process 300 proceeds directly to step 306.

In step 306, the system queries whether the user wishes to allow access to the user's contact information by all registered users of the contact management system. If the response to the query in step 306 is "NO", then a limited access flag is set on for the user in step 308, and in step 310, the user is asked to enter a list of identification numbers of privileged users that will be allowed access to the user's contact information. Process 300 then continues with step 312. If the response to the query in step 306 is "YES" then process 300 proceeds directly to step 312.

In step 312, the system queries whether the user wishes to block access to the user's contact information by any specific registered users. If the response to the query in step 312 is "YES", then a blocked access flag is set on for the user in step 314, and in step 316, the user is asked to enter a list of identification numbers of blocked users that will be denied access to the user's contact information by the system. Process 300 then continues with step 318. If the response to the query in step 306 is "NO" then process 300 proceeds directly to step 318.

In step 318 of process 300, the system queries whether the user wishes to allow other users to search for his account to receive contact information using the user's unique identification number. If the response to the query in step 318 is "NO", then in step 320, a "no-search by ID" flag is set indicating that the user's account is not retrievable using an identification number search, and the process continues with step 322. If the response to the query in step 318 is "YES" then process 300 proceeds directly to step 322.

In step 322 of process 300, the system queries whether the user wishes to allow other users to search for the user's account to retrieve contact information using the user's name. If the response to the query in step 322 is "NO", then in step 324, a "no-search by name" flag is set indicating that the user's account is not retrievable using a name search, and process 300 ends. If the response to the query in step 318 is "YES" then process 300 ends. As understood by one skilled in the art, in step 214 of process 200, account preferences may be set for a user using a process other than process 300. Further, in other embodiments, users may be requested to select other preferences, either in addition to or in place of, the preferences selected in process 300.

After the user's account preferences are set in step 214 of process 200, a unique identification number is assigned for the user in step 216. In one embodiment, the unique identification number is assigned by randomly selecting an identification number from a pool of available identification numbers. After an identification number is assigned to a user, it is removed from the pool of available identification numbers. As discussed above, in one embodiment, the pool of available identification numbers includes 16 digit numbers that satisfy a check sum criteria.

Process 200 continues with step 218, wherein the system displays an account profile of the user. In one embodiment, the account profile includes a listing of the account preferences selected by the user and the user's unique identification number. Next, in step 220, the user is asked if the profile is acceptable. If the response to step 220 is "YES", then the process continues on with step 222. If the response to step 220 is "NO", then the process 200 returns to step 214 to allow the user to input new account preferences.

In step 222 of process 200, the system displays billing information for the user, and in step 224, the user is asked if the billing information is acceptable. In one embodiment, the billing information displayed in step 222 includes customized billing information for the user based on the type of registration selected in step 202 and based on the account preferences selected by the user. In step 224, the user is asked to accept charges for use of the contact information management system based on the billing information displayed in step 222. If the outcome of step 224 is "YES", then in step 226, the user is requested to provide information for a credit card to be used by the user to pay the charges. If the outcome of step 224 is "NO", then in step 223, the user is asked if they would like to exit the system. If the outcome of step 223 is "NO", then the process returns to step 222. If the outcome of step 223 is "YES", then in step 225, the entry for the user is deleted, and in step 225, the process ends.

In step 228, the system determines whether the credit card is valid using one of a number of known procedures. If the outcome of step 228 is "NO," indicating that the credit card is not valid, then in step 230 a warning indicating invalid card entry is displayed, and process 200 returns to step 226.

In one embodiment, after a predetermined number of unsuccessful attempts by a user to enter a valid credit card number, process 200 ends. If the outcome of step 228 is "YES," indicating that the credit card entered is valid, then the process 200 continues with step 232, wherein the charges are applied to the user's credit card. The system then displays a message "receipt E-mailed" and sends an E-mail to the user to provide a receipt of the credit card transaction.

Next, in step 236 of process 200, the system generates a display to ask if the user would like a file containing a bar code corresponding to the user's assigned unique identification number to be downloaded to the user's computer. If the response to the query in step 236 is "YES," then in step 238, the system creates and downloads to the user's computer a file containing the bar code. In one embodiment, the file containing the bar code is an encapsulated postscript file, however, other file formats could be used as well. After downloading the file, process 200 proceeds to step 240. If the response to the query in step 236 is "NO," then the process continues with step 240, wherein a message "REGISTRATION COMPLETED" is displayed. Process 200 terminates after step 240.

Figure 6:
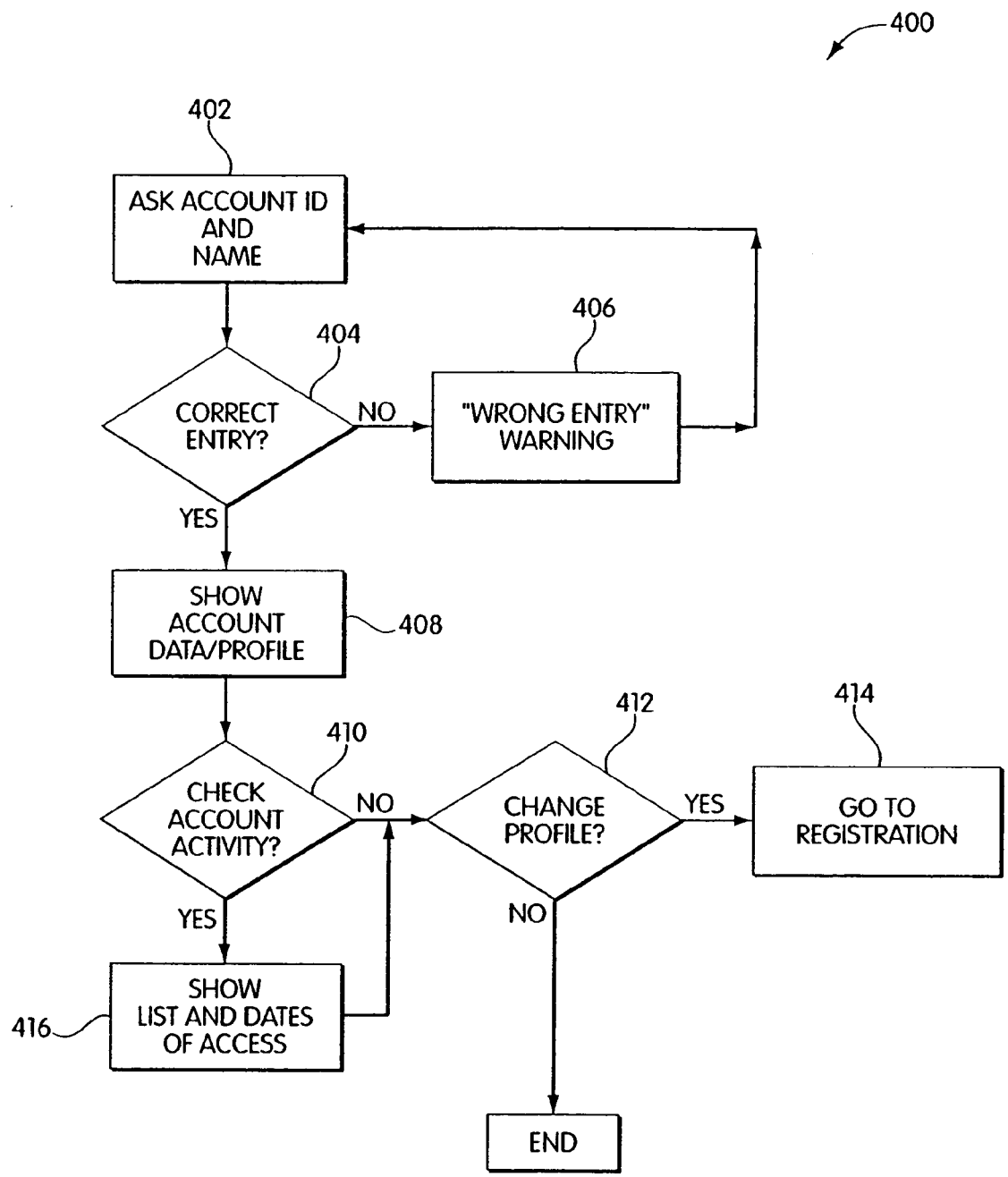
FIG. 6 is a flow chart of a login process used in embodiments of the present invention.

After a user has registered with contact information management systems of the present invention, the user can subsequently access the remote computer 16 to edit the contact data stored for the user or to check on account activity for the user's account established with the contact information management system. A process 400 for accessing the remote computer 16 in accordance with one embodiment of the present invention will now be described with reference to FIG. 6. In a first step 402 of the process 400, the user is asked to input the user's name and password. Next in step 404, the system verifies the name and password of the user. If the output of step 404 is "NO," indicating that the system was not able to verify the entered name and password, then in step 406, the system generates a display "WRONG ENTRY." The process 400 then returns to step 402. If the output of step 404 is "YES," indicating that the system was able to verify the entered name and password, then the process continues with step 408.

In step 408, the system displays a profile for the user. In one embodiment, the information displayed in step 408 is the same as that displayed in step 218 of process 200. The system then queries whether the user would like to check account activity in step 410. If the response to the query in step 410 is "YES," then in step 416, the system displays a list showing dates of access to the user's contact data by other users of the contact information management system. The process 400 then continues with step 412.

If the response to the query in step 410 is "NO," then the process 400 proceeds with step 412. In step 412, the system queries whether the user would like to change the user's profile. If the response to the query in step 412 is "YES," then in step 414, the user repeats portions of the registration process 200 to change profile data of the user. If the response to the query in step 412 is "NO," then process 400 ends.

Figure 7:
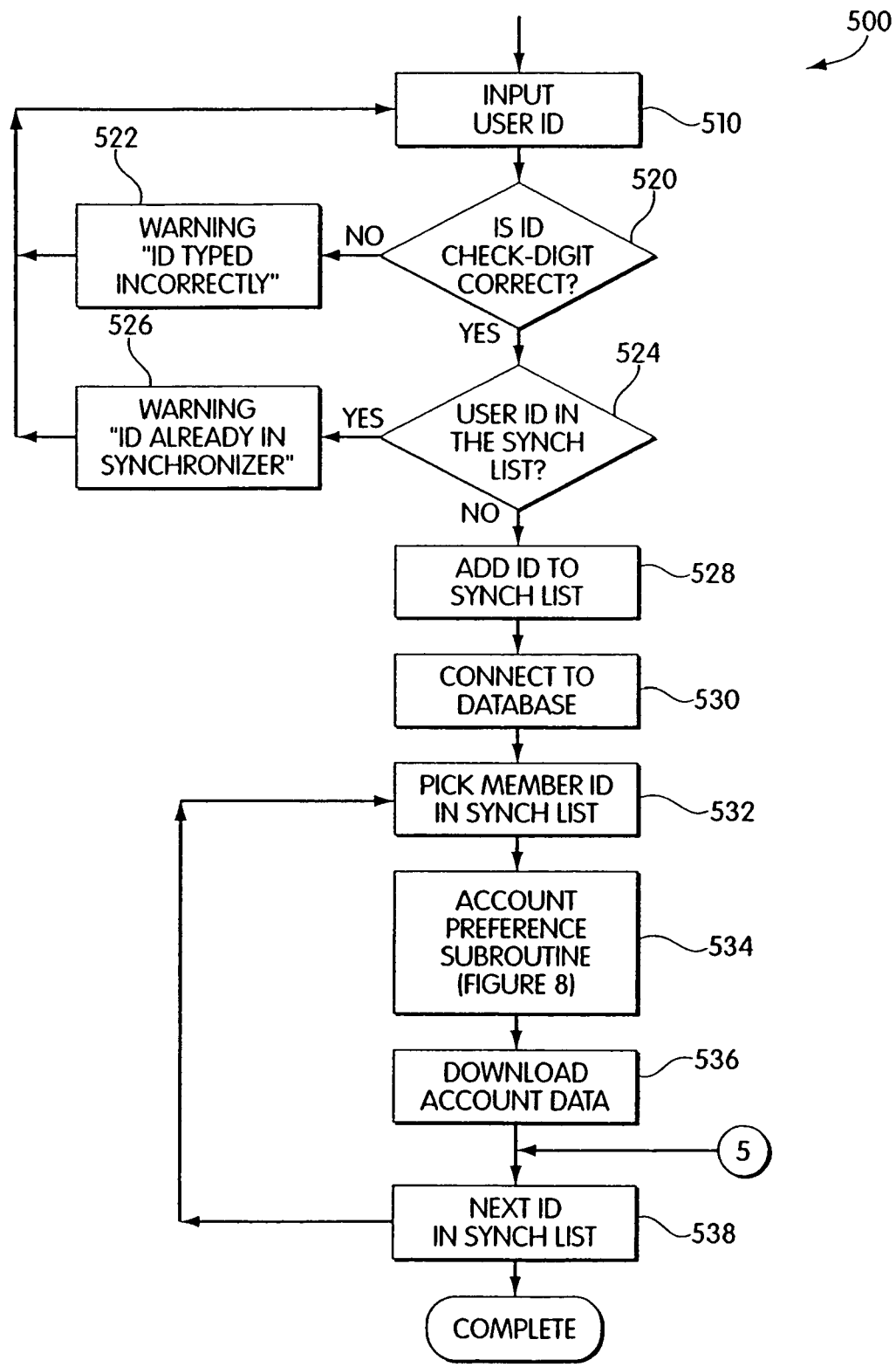
FIG. 7 is a flow chart of a synchronization process used in embodiments of the present invention.

The operation of the synchronizer in the second personal computer 14 of the computer system 10 will now be further described with reference to FIG. 7 which shows a flow chart of a synchronization process 500. The synchronization process 500 allows a user (User 2) to obtain and update data for registered users of the contact management system using the unique identification numbers of the registered users.

In a first step 510 of the process 500 a user identification number of User 1 is input into the synchronizer of the second computer. As described above, the identification number can be input into the synchronizer using a bar code reader, by typing the number in using a keyboard, or using other data entry techniques. In step 520, the synchronizer determines whether a valid identification number has been entered into the synchronizer. As discussed above, in some embodiments of the present invention, a check sum scheme is used for the identification numbers, and this scheme can be used in step 520 to verify numbers entered. If the outcome of step 520 is "NO" indicating that the number entered is not a valid identification number, then in step 522 an error message is displayed, and the process returns to step 510.

If the outcome of step 520 is "YES", then the process 500 continues with step 524, wherein the system checks whether the identification number entered into the system is already stored in a synchronizer list in the synchronizer. If the outcome of step 524 is "YES," then in step 526 a warning message is displayed, and the process returns to step 520. If the outcome of step 524 is "NO," then in step 528, the identification number is added to the synchronization list.

Figure 8:
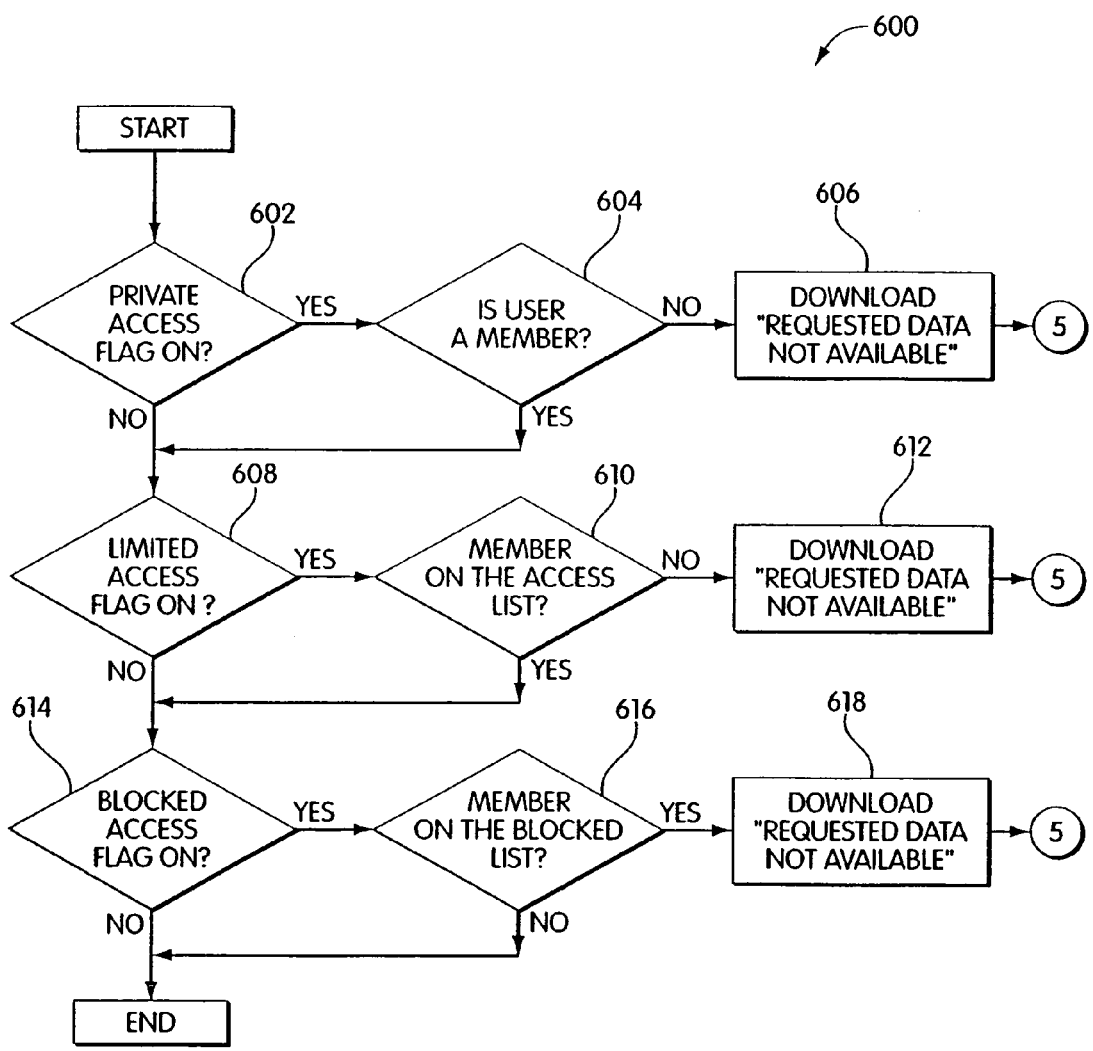
FIG. 8 is a flow chart of an account preferences subroutine used in the synchronization process of FIG. 7.

The synchronizer then connects to the database through the remote computer to obtain contact information of User 1 and to update contact information of other users whose identification number is contained in the synchronizer list. Next, in step 532, the synchronizer selects one identification number from the synchronizer list, and in step 534, an account preferences subroutine is conducted for the identification number selected in step 532. The account preferences routine reviews preferences established by the user corresponding to the identification number selected in step 532 to determine whether User 2 should be allowed access to the contact information. One embodiment of an account preferences subroutine 600 used with process 500 will now be described with reference to FIG. 8.

In a first step 602 of the process 600, a determination is made as to whether the private access flag has been set on for the identification number. If the outcome of step 602 is "YES," then in step 604, a determination is made as to whether User 2 is a registered member of the contact information management system. If the outcome of step 604 is "NO," then the process 600 proceeds to step 606, wherein a message "Requested Data is not Available" is sent to User 2. Process 600 then returns to step 538 of process 500. If the outcome of step 604 is "YES," or if the outcome of step 602 is "NO," then the process 600 continues with step 608.

In step 608, a determination is made as to whether the limited access flag has been set on for the identification number. If the outcome of step 608 is "YES," then in step 610, a determination is made as to whether User 2 is on an access list established by User 1. If the outcome of step 610 is "NO," then the process 600 proceeds to step 612, wherein a message "Requested Data is not Available" is sent to User 2. Process 600 then returns to step 538 of process 500. If the outcome of step 610 is "YES," or if the outcome of step 608 is "NO," then the process 600 continues with step 614.

In step 614, a determination is made as to whether the blocked access flag has been set on for the identification number. If the outcome of step 614 is "YES," then in step 616, a determination is made as to whether User 2 is on a blocked access list established by User 1. If the outcome of step 616 is "YES," then the process 600 proceeds to step 618, wherein a message "Requested Data is not Available" is sent to User 2. Process 600 then returns to step 538 of process 500. If the outcome of either step 614 or step 616 is "NO," then the process 600 ends and process 500 continues with step 536.

In step 536 of process 500, contact information for the user corresponding to the identification number selected in step 532 is downloaded to the second computer wherein it is stored in the PIM of the second computer. Next, in step 538, the process returns to step 532 wherein a next identification number in the synchronizer list is selected. Process 500 continues with steps 532 to 538 until contact information for all identification numbers in the synchronizer list has been downloaded to the second computer. In one embodiment of the present invention, a copy of all unique numbers in the synchronizer may also be stored in the remote database and be accessible by User 2 through an "Account Login" screen of the remote computer. This allows User 2 to access the remote computer and remote database from a computer other than the second computer to obtain contact information.

In some embodiments of the present invention, both the synchronizer and the database maintain an update log indicating the last time that contact information for a user has been updated. The update log in the database indicates the last time that the user edited his contact information in the database, and the update log in the synchronizer indicates the last time that the contact information in the PIM for the user has been updated. In these embodiments, contact information for a first user is not updated in the PIM of a second user unless the date in the update log of the database is more recent than the date in the update log of the synchronizer of the second user.

In embodiments of the present invention, users can utilize the synchronizer to periodically update contact information in the PIM. In one embodiment, the synchronizer is configured to automatically contact the remote computer and database on a periodic basis to update information in the PIM. In this embodiment, the synchronizer can access the remote computer over the internet using the web browser in the personal computer in a manner that is substantially transparent to a user of the personal computer.

Embodiments of the present invention discussed above provide an electronic personal contact information management system that allows users of the system to easily maintain up-to-date contact information on other users of the system. In embodiments of the present invention described above, a user of the system uses business cards having the user's unique identification number encoded thereon to pass the user's unique identification number to other users. In other embodiments, the user's unique identification number may be contained on documents other than business cards such as on letterhead for the user's business or on a user's resume, and may also be contained within e-mails and other electronic documents such as a vcard. In other embodiments, identification numbers may be used in management systems of the present invention to manage the ordering of replacement parts in industries such as the automotive industry. In still other embodiments, known numbering systems, such as the ISDN numbering scheme used to identify books, may be used with systems of the present invention to allow users to update information related to books or other items.

The methods and systems of embodiments of the present invention described above allow users to communicate business contact information to other users. Other embodiments of the present invention may be used in a similar manner to allow users to communicate personal contact information to friends and acquaintances. In still other embodiments, businesses may use contact information systems of the present invention to provide customers, vendors, or others with contact information regarding a particular position within the business. For example, a unique identification number may be assigned to a business's sales manager, and the unique identification number may be included on the sales manager's business card. Customers of the business may include the identification number of the sales manager in a synchronizer and/or PIM as described above and the customers can receive and update contact information of the sales manager. If a new sales manager is appointed by the company to replace the existing sales manager, then the contact information for the sales manager position in the system database can be updated to include the new sales manager's name. The name of the sales manager in the customer's PIM will be updated upon the next synchronization by the customer with the system database.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A computer implemented contact information management method comprising steps of:
    storing contact information related to a first user in a first database operatively coupled to a remote first computer, the first user being identified by a user identifier; and
    providing an interface for a second user to access the first database over a network using a second computer to retrieve the contact information related to the first user using the user identifier of the first user;
    creating a second database of user contact information in the second computer;
    inserting contact information related to the first user into the second database of the second computer;
    providing an interface for the first user to edit the contact information related to the first user stored in the first database;
    changing contact information related to the first user in the second database of the second computer by accessing contact information in the first database; and
    providing an interface for the second user to access the updated contact information related to the first user, the second user is enabled to access the updated information related to the first user by way of receiving the user identifier of the first user,
    synchronizing contact information in the second database with contact information contained in the first database.

2. The contact information management method of claim 1, further comprising providing the first user with a bar code representation of the user identifier.

3. The contact information management method of claim 2, further comprising a step of printing characters representative of the user identifier on a document.

4. The contact information management method of claim 3, wherein the document is a business card.

5. The contact information management method of claim 3, wherein the step of printing includes a step of printing the bar code on the document.

6. The contact information management method of claim 1, wherein the second computer accesses the first database over the Internet.

7. The contact information management method of claim 1 wherein the identifier includes an alphanumeric identification code.

8. The contact information management method of claim 1 further comprising registering as a new user by entering contact data associated with the user identifier of the new user, the contact data including at least one of an e-mail address, a name, a telephone number, an address, a title, and a facsimile number.

9. The contact information management method of claim 8 wherein registering includes designating a registration type including a professional, a corporation, and an individual.

10. The contact information management method of claim 8 further comprising verifying the registration of a new user by matching the e-mail address as a user identifier against existing contact information in the first database.

11. The contact information management method of claim 1 further comprising designating the contact information related to the first user as blocked to deny access to the contact information by the plurality of second users.

12. The contact information management method of claim 1 further comprising designating the contact information related to the first user as publicly accessible.

13. The contact information management method of claim 1 further comprising entering an identifier that identifies a plurality of privileged users that have access to the stored contact information, wherein the privileged users comprise at least one of the plurality of second users.

14. The contact information management method of claim 1 further comprising assigning a second user identifier to one of the plurality of second users and providing access to the first database by one of the plurality of second users using the second user identifier.

15. A computer implemented contact information management system comprising:
    a first computer;
    a first database operatively coupled to the first computer, the first database containing contact information for each of a plurality of users of the contact information management system, wherein each of the users is identified by a user identifier, and the contact information for each user is stored along with the user identifier of the user in the first database;
    wherein the first computer includes:
        a network interface that interfaces with a network and provides users of the contact information management system access to the first computer;
        a database interface that controls transfer of data between the first database and a remote second network computer via the network;
        an application containing instructions that, when executed by the first computer, provides an interface i) for a network user to access the first database over the network using the second network computer to retrieve contact information in the first database related to a first user, the network user is enabled to access the first database by way of receiving a user identifier associated with the first user, ii) for the first user to edit the contact information related to the first user stored in the first database, iii) for access to the edited contact information in the first database to update the contact information related to the first user in second database of the second network computer, and iv) to synchronize the contact information in the second database with contact information contained in the first database.

16. The contact information management system of claim 15, wherein the application further includes instructions that, when executed by the first computer, provides the first user with a bar code representation of the user identifier.

17. A computer implemented contact information management system comprising:

means for storing contact information related to a first user in first database operatively coupled to a remote first computer, the first user being identified by a user identifier;

means for providing an interface for a second user to access the first database over a network using a second network computer to retrieve the contact information related to the first user using the user identifier of the first user;

means for creating a second database of user contact information in the second computer;

means for inserting contact information related to the first user into the second database of the second computer;

means for providing an interface for the first user to edit the contact information related to the first user stored in the first database;

means for changing contact information related to the first user in the second database of the second computer by accessing contact information in the first database; and means for providing an interface for the second user to access the updated contact information related to the first user, the second user is enabled to access the updated information related to the first user by way of receiving the user identifier of the first user, means for synchronizing contact information in the second database with contact information contained in the first database.

18. The contact information management system of claim 17, further comprising means for providing the first user with a bar code representation of the user identifier.

19. The contact information management system of claim 17, further comprising means for providing an interface for the first user to access the first computer over a network using a first network computer to edit the contact information related to the first user stored in the first database.

20. The contact information management system of claim 17, further comprising means for receiving contact information from and providing contact information to the second user over the Internet.

21. The contact information management system of claim 17, wherein the means for storing contains for the second user a blocked list that identifies blocked users that are not authorized to access contact information of the first user.

* * * * *

UNITED STATES PATENT AND TRADEMARK OFFICE
CERTIFICATE OF CORRECTION

| | | |
|---|---|---|
| PATENT NO. | : 7,296,036 B2 | Page 1 of 1 |
| APPLICATION NO. | : 10/657757 | |
| DATED | : November 13, 2007 | |
| INVENTOR(S) | : Feyzi Celik | |

It is certified that error appears in the above-identified patent and that said Letters Patent is hereby corrected as shown below:

On the Title page, item [63] Related U.S. Application Data, replace the text of the first paragraph with:

Continuation of patent application U.S.S.N. 10/123,788, filed on April 16, 2002, now U.S. Pat. No. 6,654,768, which is a continuation of patent application U.S.S.N. 09/223,129, filed December 30, 1998, now U.S. Patent No. 6,374,259.

Column 1, lines 5-11, replace the text with:

Related Applications

This application is a continuation of patent application U.S.S.N. 10/123,788, filed on April 16, 2002, now U.S. Pat. No. 6,654,768, which is a continuation of patent application U.S.S.N. 09/223,129, filed December 30, 1998, now U.S. Patent No. 6,374,259, which claims priority from U.S.S.N. 60/102,614, filed October 1, 1998, each of which, with the exception of U.S.S.N. 10/123,788, now U.S. Pat. No. 6,654,768, is incorporated herein by reference.

Signed and Sealed this
Fifteenth Day of May, 2012

David J. Kappos
*Director of the United States Patent and Trademark Office*